(12) United States Patent
Deng

(10) Patent No.: US 8,751,404 B2
(45) Date of Patent: Jun. 10, 2014

(54) METHOD AND MOBILE TERMINAL FOR REALIZING NETWORK PAYMENT

(75) Inventor: Yingbo Deng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/575,429

(22) PCT Filed: Dec. 29, 2010

(86) PCT No.: PCT/CN2010/080425
§ 371 (c)(1),
(2), (4) Date: Jul. 26, 2012

(87) PCT Pub. No.: WO2012/034339
PCT Pub. Date: Mar. 22, 2012

(65) Prior Publication Data
US 2012/0296830 A1    Nov. 22, 2012

(30) Foreign Application Priority Data

Sep. 19, 2010  (CN) .............................. 201010288947

(51) Int. Cl.
G06Q 20/00  (2012.01)
G06Q 20/02  (2012.01)
(52) U.S. Cl.
CPC .................................... G06Q 20/02 (2013.01)
USPC .................... 705/64; 705/65; 705/67; 705/75
(58) Field of Classification Search
CPC ..................................................... G06Q 20/02
USPC ........................................................... 705/71
See application file for complete search history.

(56) References Cited

U.S. PATENT DOCUMENTS 6,327,578 B1 * 12/2001 Linehan ........................... 705/65
6,836,765 B1 * 12/2004 Sussman ......................... 705/75
7,107,248 B1    9/2006 Asokan et al.
(Continued)

FOREIGN PATENT DOCUMENTS

CN     1427351 A    7/2003
CN     1555643 A    12/2004
(Continued)

OTHER PUBLICATIONS

International Search Report in international application number: PCT/CN2010/080425, mailed on Jun. 9, 2011.
(Continued)

*Primary Examiner* — Charles C Agwumezie
(74) *Attorney, Agent, or Firm* — LeClairRyan, a Professional Corporation

(57) ABSTRACT

For solving the problem that multiple Universal Serial Bus (USB) Keys are required to be taken to realize multiple network payments in the conventional art, the provides a method and a mobile terminal for realizing network payment. The method includes: a mobile terminal selects a network payment system which is needed to implement current network payment from a plurality of network payment systems according to an instruction input by a user; when the user is confirmed to be a legal user according to the digital certificate, the mobile terminal logs on the selected network payment system and implements the network payment. The selects a network payment system which is needed to implement the current network payment from a plurality of network payment systems, thus it is not needed to take multiple USB Keys.

8 Claims, 2 Drawing Sheets

(56) References Cited

U.S. PATENT DOCUMENTS

| | | |
|---|---|---|
| 2004/0158716 A1* | 8/2004 | Turtiainen et al. ............ 713/172 |
| 2005/0037735 A1 | 2/2005 | Coutts |
| 2006/0117381 A1* | 6/2006 | Sylvain ............................ 726/8 |
| 2009/0150266 A1 | 6/2009 | Dickelman |
| 2011/0078079 A1 | 3/2011 | Shin |
| 2012/0041879 A1* | 2/2012 | Kim et al. ........................ 705/44 |
| 2012/0253978 A1* | 10/2012 | Bishop et al. .............. 705/26.41 |

FOREIGN PATENT DOCUMENTS

| | | |
|---|---|---|
| CN | 101299286 A | 11/2008 |
| CN | 101394615 A | 3/2009 |
| CN | 101414909 A | 4/2009 |
| EP | 1505794 A2 | 2/2005 |
| FR | 2814880 A1 | 4/2002 |
| WO | 9834203 A1 | 8/1998 |
| WO | 0221464 A2 | 3/2002 |
| WO | 2008102935 A1 | 8/2008 |

OTHER PUBLICATIONS

Supplementary European Search Report in European application number: 10857195.1, mailed on Dec. 19, 2012.

English Translation of the Written Opinion of the International Search Authority in international application number: PCT/CN20101080425, mailed on Jun. 9, 2011.

English Translation of the Written Opinion of the International Search Authority in international application No. PCT/CN2010/080425, mailed on Jun. 9, 2011.

* cited by examiner

METHOD AND MOBILE TERMINAL FOR REALIZING NETWORK PAYMENT

This application is a national stage application under 35 U.S.C. §371 from PCT Application No. PCT/CN2010/080425, filed Dec. 29, 2010, which claims the priority benefit of China Application No. 201010288947.9, filed Sep. 19, 2010.

TECHNICAL FIELD

The present disclosure relates to the field of communication technologies, in particular to a method and a mobile terminal for realizing network payment.

BACKGROUND

With the development of network and the fast life rhythm of modern urbanite, online shopping becomes popular and enables people to buy what they want without leaving home; however, there is a risk in online shopping through a bank card, for example, there may exist Hacker, false website, virus Trojan, etc.; in order to guarantee the security of network, Universal Serial Bus (USB) Key is a digital certificate proposed by bank systems to apply in the network and identify a customer in the form of client end. From a technology perspective, the USB Key is a tool used for electronic signature and digital certification of internet banking; in the USB Key, a micro intelligent card processor is embedded and adopts a 1024-bit asymmetric cipher algorithm to encrypt/decrypt and digitally sign the internet data, so as to guarantee the confidentiality, authenticity, completeness and non-repudiation of online transactions.

At present, almost every one makes transactions at several banks simultaneously; if payments are conducted online through several banks, several USB Keys are needed; thus great inconvenience is caused to consumers.

SUMMARY

In order to solve the problem that a plurality of USB Keys are required to be taken to realize a plurality of network payments in the conventional art, the disclosure provides a method and a mobile terminal for realizing network payment.

A method for realizing network payment provided by an embodiment of the disclosure includes:

selecting, by a mobile terminal, a network payment system which is needed to implement current network payment from a plurality of network payment systems according to an instruction input by a user;

sending, by the mobile terminal, a corresponding digital certificate needed by authentication to the selected network payment system;

when the user is confirmed to be a legal user according to the digital certificate, logging, by the mobile terminal, on the selected network payment system and implementing the network payment.

An embodiment of the disclosure further provides a mobile terminal for realizing network payment, including:

a selection module configured to select a network payment system which is needed to implement current network payment from a plurality of network payment systems according to an instruction input by a user;

a sending module configured to send a corresponding digital certificate needed by authentication to the selected network payment system; and a payment module configured, when the user is confirmed to be a legal user according to the digital certificate, to log on the selected network payment system and implement the network payment.

In the technical scheme provided by the embodiments of the disclosure, a mobile terminal selects a network payment system from a plurality of network payment systems, therefore, it is not needed to take multiple USB Keys.

DETAILED DESCRIPTION

The technical scheme in the embodiments of the disclosure is illustrated below in detail in conjunction with the accompanying drawings; for solving the problem that a plurality of USB Keys are required to be taken to realize multiple network payments in the conventional art, the embodiments of the disclosure provides a method and a mobile terminal for realizing network payment; it is needed to explain that the embodiments of the disclosure describe a flow of implementing network payment of several banks online using a digital certificate and a implementation process of an encryption algorithm. First, it is required to apply for a digital certificate in a network payment system of a bank, then the digital certificate is imported to a mobile terminal through the network payment system of the bank, and then, a logon registration is needed to perform in the network payment system of the bank, and a customer needs to set a cipher key himself/herself, wherein the cipher key would be stored in an encryption chip of the mobile terminal and a server of the bank simultaneously. For example, three network payment systems of three banks are provided, namely, network payment system 1, network payment system 2 and network payment system 3; the corresponding cipher keys set by the user is A1, A2 and A3 respectively and the cipher keys are stored in the mobile terminal; the corresponding encryption algorithms are B1, B2 and B3 respectively; after the digital certificate is imported successfully, the interface of the mobile terminal would display that the network payment functions of the three banks are started.

Figure 1:
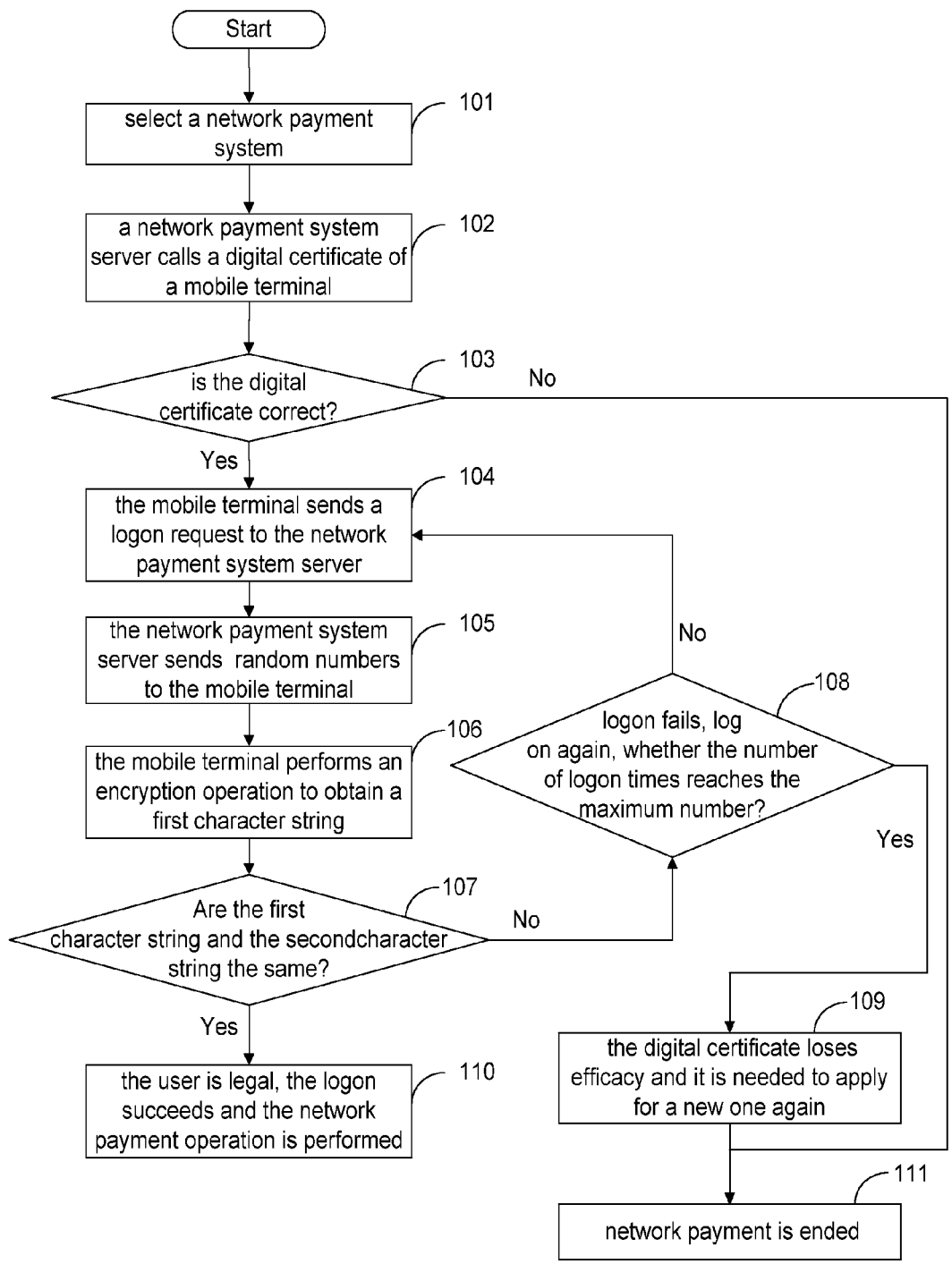
FIG. 1 shows a flowchart of a method provided by an embodiment of the disclosure.

The method for realizing network payment in this disclosure includes: a mobile terminal selects a network payment system which is needed to implement current network payment from a plurality of network payment systems according to an instruction input by a user; the mobile terminal sends a corresponding digital certificate needed by authentication to the selected network payment system; when the user is confirmed to be a legal user according to the digital certificate, the mobile terminal logs on the selected network payment system and implements the network payment operation. Hereinafter, the method for realizing network payment provided by the embodiment is illustrated in conjunction with FIG. 1, wherein the method comprises the following steps:

step 101: when network payment is needed, a mobile terminal selects a corresponding network payment system according to an instruction input by a user, for example, the mobile terminal selects network payment system 1 according to instruction 1 input by the user; correspondingly, the network payment function of the bank corresponding to the network payment system 1 is started;

step 102: a network payment system server calls a digital certificate of the mobile terminal;

the operation that the network payment system server calls a digital certificate of the mobile terminal is to verify the validity of the digital certificate;

step 103: the network payment system server checks the digital certificate; if the provided digital certificate is incorrect, step 111 is executed and the network payment is ended; if the provided digital certificate is correct, step 104 is executed;

step 104: the mobile terminal sends a logon request to the network payment system server through the network;

when sending the logon request, the mobile terminal also needs to send a username and a logon password input by the user to the network payment system server;

step 105: after receiving the logon request, the network payment system server sends a string of random numbers to the mobile terminal;

after confirming, through verification, that the username and the logon password input by the user are correct, the network payment system server sends a string of random numbers to the mobile terminal;

step 106: after receiving the string of random numbers sent by the network payment system, the mobile terminal performs an encryption operation on the received random numbers through a cipher key corresponding to the network payment system and an encryption algorithm corresponding to the network payment system to obtain a first character string and sends the first character string to the network payment system;

for example, the mobile terminal receives random numbers sent from the server of the network payment system 1, wherein the cipher key corresponding to the network payment system 1 is Al and the corresponding encryption algorithm is B1, then the mobile terminal adds the random numbers to the cipher key Al and encrypts them using B1 to obtain a first character string C1 and sends the first character string C1 to the network payment system 1;

step 107: the network payment system server performs an encryption operation on the random numbers according to the cipher key corresponding to the network payment system and the encryption algorithm corresponding to the network payment system to obtain a second character string; if the first character string is equal to the second character string, it is indicated that the user is a legal user of the bank corresponding to the network payment system 1, then step 110 is executed; otherwise, step 108 is executed;

the encryption operation mentioned in step 106 is the same as that mentioned in step 107; the difference is that the encryption operation mentioned in step 106 is performed in the mobile terminal while the encryption operation mentioned in step 107 is performed in the network payment system server;

step 108: a logon failure is displayed and a logon operation is performed again;

whether the number of logon times reaches the maximum number of logon times is determined; if it does not reach the maximum number, step 104 is returned back to d perform logon, otherwise, step 109 is executed;

step 109: when the digital certificate loses efficacy, it is needed to apply for a digital certificate again in the bank; and the network payment goes to end;

step 110: when the user is legal, the user is allowed to log on to implement the network payment operation on the mobile terminal. Specifically, the mobile terminal implements the network payment operation by connecting to a wired interface or in a wireless mode;

step 111: the network payment is ended.

During specific implementation, the mobile terminal performs an network payment operation using a digital certificate.

The implementation of the embodiment only needs to embed an encryption chip supporting a plurality of encryption operations into the mobile terminal, without adding new things to a bank service center, wherein the digital certificate is stored in a Flash through a Digital Base Band (DBB) while being imported to the encryption chip; at this moment, the encryption chip possesses an encryption function supporting a certain encryption algorithm, the Flash stores the corresponding relationship between a network payment system of a bank and an encryption algorithm. A command (indicating whether logon succeeds) sent by the network payment system server also is stored in the Flash through the DBB, and software takes charge of the function of reading from the Flash and the displaying function, for example, after a digital certificate is imported to a mobile terminal, the digital certificate is written into a Flash through a DBB, when it is needed to query which bank has the network payment function supported by the mobile terminal, the mobile terminal reads information of the digital certificate through the Flash and displays "Network Payment Function Started", and logs on the website of the bank; when executing step 106, the corresponding relationship between a network payment system and an encryption algorithm is read from the Flash, if the network payment system 1 supports the encryption algorithm B1, then the encryption chip adopts the algorithm B1 to perform check-up. when the server of the network payment system 1 determines that the user is an illegal user, the server of the network payment system 1 sends a command indicative of logon failure, then the mobile terminal reads the logon failure through the Flash and displays it; when what is stored in the Flash through the DBB is a logon success message, the mobile terminal reads a logon allowed message from the Flash to perform logon.

As explained above, an encryption operation performed by applying an encryption algorithm is simultaneously performed in a network payment system server of a bank and an encryption chip of a mobile terminal, and hardware only needs to accomplish data transfer via two ways (a wired mode and a wireless mode).

In the wired mode (that is, a mobile terminal is connected to a personal computer through a data line), data between a network payment system server of a bank and an encryption chip of the mobile terminal is transferred through Universal Serial Bus (USB), wherein besides supplying power to the encryption chip, a base band chip also transfers USB data to the encryption chip and implements a network payment operation.

In the wireless mode (that is, the mobile terminal is used to surf the internet), the data between the network payment system server of the bank and the encryption chip of the mobile terminal first arrives a mobile server and then a mobile terminal Radio Frequency (RF) module through a wireless network; after receiving the data, the RF module demodulates it through the base band chip and then transmits it to the encryption chip, and implements a network payment operation.

The transferred data is encrypted; the data is a messy code even if it is acquired; thus the security of the network payment is guaranteed in view of hardware.

Figure 2:
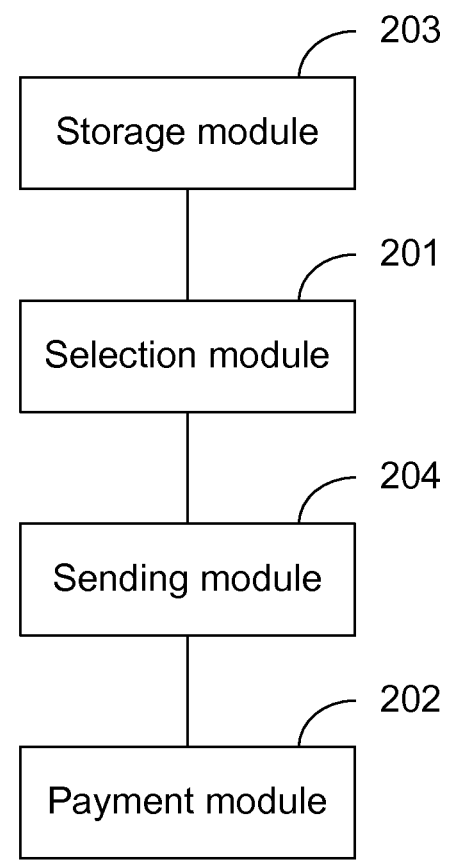
FIG. 2 shows a structure diagram of a device provided by an embodiment of the disclosure.

An embodiment of the disclosure also provides a mobile terminal for realizing network payment, as shown in FIG. 2, the mobile terminal comprises:

a selection module 201 configured to select a network payment system which is needed to implement current network payment from a plurality of network payment systems according to an instruction input by a user;

a sending module 204 configured to send a corresponding digital certificate needed by authentication to the selected network payment system; and a payment module 202 configured, when the user is confirmed to be a legal user according to the digital certificate, to log on the selected network payment system and implement the network payment.

Further, the payment module 202 is further configured, when determining that the digital certificate is correct, to send a logon request to the selected network payment system through a network, receive a string of random numbers sent by the selected network payment system and then perform an encryption operation on the received random numbers through a cipher key corresponding to the selected network payment system and an encryption algorithm corresponding to the selected network payment system to obtain a first character string and send the first character string to the selected network payment system; and according to a logon allowed message sent by the selected network payment, to log on the selected network payment system, wherein the logon allowed message is sent after the selected network payment system performs an encryption operation on the random numbers according to the cipher key corresponding to the selected network payment system itself and the encryption algorithm corresponding to the selected network payment system itself to obtain a second character string, compares the first character string with the second character string and confirms that the two are the same and that the user is legal.

Further, the payment module 202 is further configured to implement the network payment by connecting to a wired interface or in a wireless mode.

Further, the mobile terminal also comprises: a storage module 203 configured to store the digital certificate into a Flash through a DBB.

The payment module 202 is further configured to implement the network payment using the digital certificate.

Further, the payment module 202 also is configured to store the logon allowed message sent by the selected network payment into a Flash through a DBB and extract the logon allowed message from the Flash to perform logon.

Obviously, those skilled in the art can make various changes and modifications to the disclosure without departing from the spirit and the scope of the disclosure. In this way, if the changes and modifications of the disclosure belong to the scope of the claims of the disclosure and the equivalent technology, the disclosure is intended to include these changes and the modifications.

The invention claimed is:

1. A method for authenticating network payment through a mobile terminal, wherein the mobile terminal includes a Flash memory storing a plurality of digital certificates for a user, each corresponding to one of a plurality of network payment systems, and correspondence between the plurality of network payment systems and the plurality of digital certificates, the method comprising:

selecting, by the mobile terminal, a network payment system which is needed to implement current network payment from the plurality of network payment systems according to an instruction input by the user;

reading, by the mobile terminal, from the Flash memory the correspondence between the plurality of selected network payment systems and the plurality of digital certificates;

selecting, by the mobile terminal, from the plurality of digital certificates for the user stored in the Flash memory one of the digital certificates corresponding to the selected network payment system based on the correspondence between the selected network payment system and the corresponding digital certificate;

sending, by the mobile terminal, the corresponding digital certificate needed for authentication to the selected network payment system; and when the user is confirmed by the selected network payment system to be a legal user according to the corresponding digital certificate, logging, by the mobile terminal, on the selected network payment system.

2. The method according to claim 1, wherein the logging, by the mobile terminal, on the selected network payment system further comprises:

when the mobile terminal determines that the digital certificate exists, sending, by the mobile terminal, a logon request to the selected network payment system;

after the mobile terminal receives a string of random numbers sent by the selected network payment system, performing, by the mobile terminal, an encryption operation on the received random numbers through a cipher key corresponding to the selected network payment system and an encryption algorithm corresponding to the selected network payment system to obtain a first character string and sending the first character string to the selected network payment system; and according to a logon allowed message sent by the selected network payment, logging, by the mobile terminal, on the selected network payment system, wherein the logon allowed message is sent after the selected network payment system performs an encryption operation on the random numbers according to the cipher key corresponding to the selected network payment system itself and the encryption algorithm corresponding to the selected network payment system itself to obtain a second character string, compares the first character string with the second character string and confirms that the two are the same and that the user is legal.

3. The method according to claim 1, further comprising implementing the network payment by the mobile terminal by connecting to a wired interface or in a wireless mode.

4. The method according to claim 2, wherein the logging by the mobile terminal on the selected network payment system according to a logon allowed message sent by the selected network payment further comprises:

storing the logon allowed message sent by the selected network payment into the Flash memory and extracting the logon allowed message from the Flash memory to perform logon by the mobile terminal.

5. A mobile terminal for authenticating network payment, comprising a first memory storing instructions that when executed by a processor cause the processor to perform steps comprising:

storing a plurality of digital certificates for a user into a Flash memory;

selecting a network payment system which is needed to implement current network payment from a plurality of network payment systems according to an instruction input by the user;

selecting one of the plurality of digital certificates for the user corresponding to the selected network payment system and which is needed for authentication to the selected network payment system from the Flash memory;

sending the corresponding digital certificate needed for authentication to the selected network payment system; and when the user is confirmed to be a legal user according to the digital certificate, logging on the selected network payment system.

6. The system mobile terminal according to claim 5, wherein the first memory further stores instructions that when executed by the processor cause the processor to perform steps further comprising, when determining that the digital certificate exists:

sending a logon request to the selected network payment system through a network;

receiving a string of random numbers sent by the selected network payment system;

performing an encryption operation on the received random numbers through a cipher key corresponding to the selected network payment system and an encryption algorithm corresponding to the selected network payment system to obtain a first character string;

sending the first character string to the selected network payment system; and according to a logon allowed message sent by the selected network payment, logging on the selected network payment system, wherein the logon allowed message is sent after the selected network payment system performs an encryption operation on the random numbers according to the cipher key corresponding to the selected network payment system itself and the encryption algorithm corresponding to the selected network payment system itself to obtain a second character string, compares the first character string with the second character string and confirms that the two are the same and that the user is legal.

7. The mobile terminal according to claim 5, wherein the first memory further stores instructions that when executed by the processor cause the processor to perform steps further comprising implementing the network payment by connecting to a wired interface or in a wireless mode.

8. The mobile terminal according to claim 6, wherein the first memory further stores instructions that when executed by the processor cause the processor to perform steps further comprising storing the logon allowed message sent by the selected network payment into the Flash memory and extracting the logon allowed message from the Flash memory to perform logon.

* * * * *